United States Patent
Mera et al.

(10) Patent No.: US 9,787,716 B2
(45) Date of Patent: *Oct. 10, 2017

(54) POWER SAVING CONTROL APPARATUS AND METHOD

(75) Inventors: Keisuke Mera, Kawasaki (JP); Yusuke Doi, Yokohama (JP); Takafumi Sakamoto, Machida (JP); Toshiyuki Umeda, Inagi (JP); Shoji Otaka, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 1561 days.

This patent is subject to a terminal disclaimer.

(21) Appl. No.: 12/269,523

(22) Filed: Nov. 12, 2008

(65) Prior Publication Data

US 2009/0132836 A1 May 21, 2009

(30) Foreign Application Priority Data

Nov. 16, 2007 (JP) ................................. 2007-298417

(51) Int. Cl.
*H04L 29/06* (2006.01)
*H04W 52/02* (2009.01)
(Continued)

(52) U.S. Cl.
CPC ............ *H04L 63/166* (2013.01); *H04L 63/08* (2013.01); *H04W 52/0229* (2013.01); *H04W 12/06* (2013.01); *Y02B 60/50* (2013.01)

(58) Field of Classification Search
CPC .......... G06F 21/30; G06F 21/62; G06F 21/31; G06F 21/6218
See application file for complete search history.

(56) References Cited

U.S. PATENT DOCUMENTS 4,847,614 A * 7/1989 Keller ................ G07C 9/00182
340/5.64
5,363,448 A * 11/1994 Koopman, Jr. ......... G06F 7/584
340/5.26
(Continued)

FOREIGN PATENT DOCUMENTS

| CN | 1086284 A | 5/1994 |
| CN | 1210423 A | 3/1999 |
| CN | 1736055 A | 2/2006 |

OTHER PUBLICATIONS

Graham Knott; AM Radio Block Diagram; 1999; ntlWorld.*

(Continued)

*Primary Examiner* — Eric Chen
(74) *Attorney, Agent, or Firm* — Oblon, McClelland, Maier & Neustadt, L.L.P.

(57) ABSTRACT

A power-saving control apparatus includes a memory storing first to Nth different authentication codes, determines, every time a signal including an authentication code is received, whether the authentication code in the received signal is a valid code which matches one of the authentication codes in the memory, outputs an operation signal to a main apparatus when the authentication code in the received signal is determined to be the valid code, and generates a new authentication code, when (a) the number of times the authentication code in each received signal matches a first authentication code of the authentication codes in the memory is equal to a predetermined value or (b) the authentication code in the received signal matches a second or subsequent authentication code of the authentication codes in the memory, to delete one of the authentication codes in the memory, and to store the new authentication code in the memory.

5 Claims, 13 Drawing Sheets

(51) Int. Cl.

| | |
|---|---|
| *G06F 7/04* | (2006.01) |
| *G06F 12/00* | (2006.01) |
| *G06F 12/14* | (2006.01) |
| *G06F 13/00* | (2006.01) |
| *G06F 17/30* | (2006.01) |
| *H04W 12/06* | (2009.01) |

(56) References Cited

U.S. PATENT DOCUMENTS

| | | | | |
|---|---|---|---|---|
| 6,041,410 | A * | 3/2000 | Hsu | G06K 9/00013 |
| | | | | 380/285 |
| 6,055,638 | A * | 4/2000 | Pascal et al. | 726/20 |
| 6,304,968 | B1 * | 10/2001 | Hacker et al. | 713/153 |
| 7,353,542 | B2 * | 4/2008 | Shiga et al. | 726/28 |
| 7,571,471 | B2 * | 8/2009 | Sandhu | H04L 9/0825 |
| | | | | 726/17 |
| 7,958,032 | B2 | 6/2011 | Schimpf et al. | 705/35 |
| 2002/0116616 | A1 * | 8/2002 | Mi et al. | 713/168 |
| 2003/0159041 | A1 * | 8/2003 | Yokota et al. | 713/168 |
| 2004/0010697 | A1 * | 1/2004 | White | 713/186 |
| 2004/0073621 | A1 * | 4/2004 | Sampson | 709/209 |
| 2004/0177280 | A1 * | 9/2004 | Maruyama et al. | 713/202 |
| 2005/0080909 | A1 * | 4/2005 | Panasyuk et al. | 709/229 |
| 2005/0216738 | A1 * | 9/2005 | Kita et al. | 713/168 |
| 2006/0070131 | A1 * | 3/2006 | Braddy et al. | 726/27 |
| 2006/0255910 | A1 * | 11/2006 | Fukushima et al. | 340/5.65 |
| 2007/0239980 | A1 * | 10/2007 | Funayama | 713/155 |
| 2008/0320588 | A1 * | 12/2008 | Lipetz | 726/19 |
| 2009/0172056 | A1 * | 7/2009 | Pradhan et al. | 708/255 |
| 2009/0195353 | A1 * | 8/2009 | Nakanishi | G08C 17/02 |
| | | | | 340/5.2 |
| 2009/0199292 | A1 * | 8/2009 | Sakamoto | B60R 25/24 |
| | | | | 726/17 |
| 2010/0037082 | A1 * | 2/2010 | Sakamoto | G08C 17/02 |
| | | | | 713/502 |

OTHER PUBLICATIONS

U.S. Appl. No. 12/364,409, filed Feb. 2, 2009, Nakanishi, et al.
U.S. Appl. No. 12/364,109, filed Feb. 2, 2009, Sakamoto, et al.
U.S. Appl. No. 12/501,650, filed Jul. 13, 2009, Sakamoto, et al.
Neil M. Haller, "The S/Key™ One-Time Password System", ISOC, 1994, pp. 1-8.
"RSA SecurID Authenticators Accelerate your business with the gold standard in two-factor authentication", RSA The Security Division of EMC, 4 pages.

\* cited by examiner

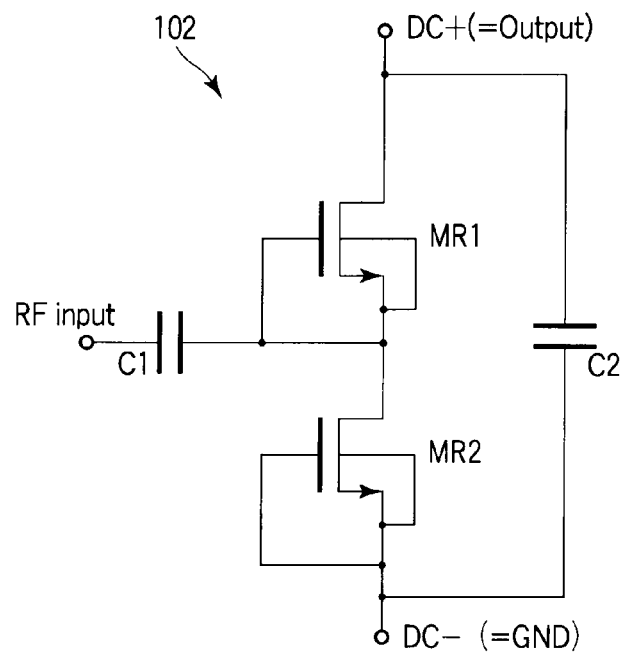
F I G. 3
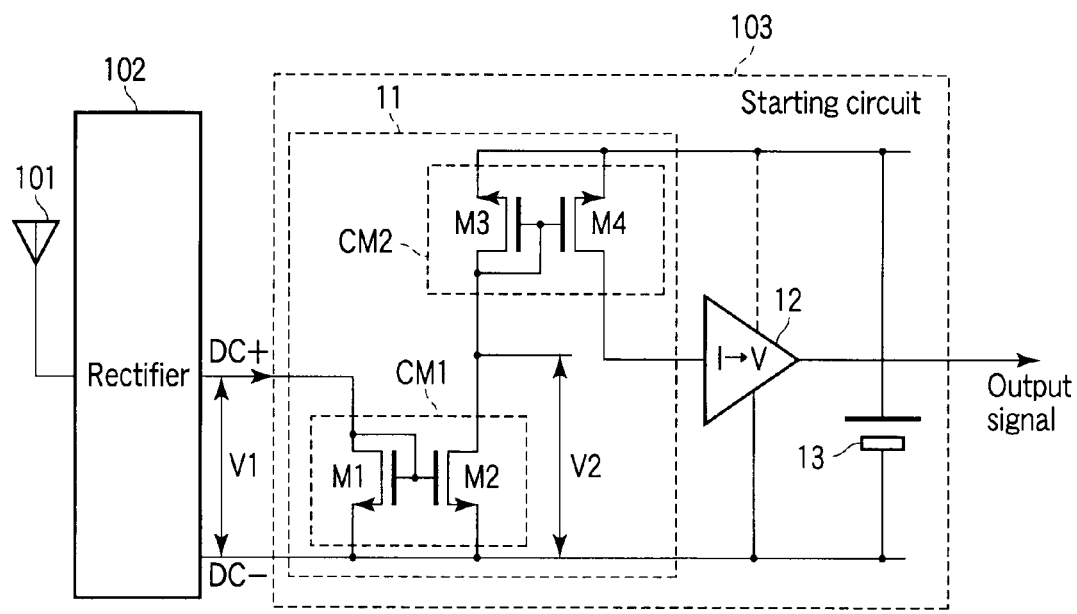
F I G. 4

| Authentication No. | First authentication code | |
|---|---|---|
| 100 | T(25) | ⎫ |
| 99 | T(25) | ⎬ Nmax=4 |
| 98 | T(25) | |
| 97 | T(25) | ⎭ |
| 96 | T(24) | |
| 95 | T(24) | |
| ⋮ | ⋮ | |
| 4 | T(1) | ⎫ |
| 3 | T(1) | ⎬ Nmax=4 |
| 2 | T(1) | |
| 1 | T(1) | ⎭ |

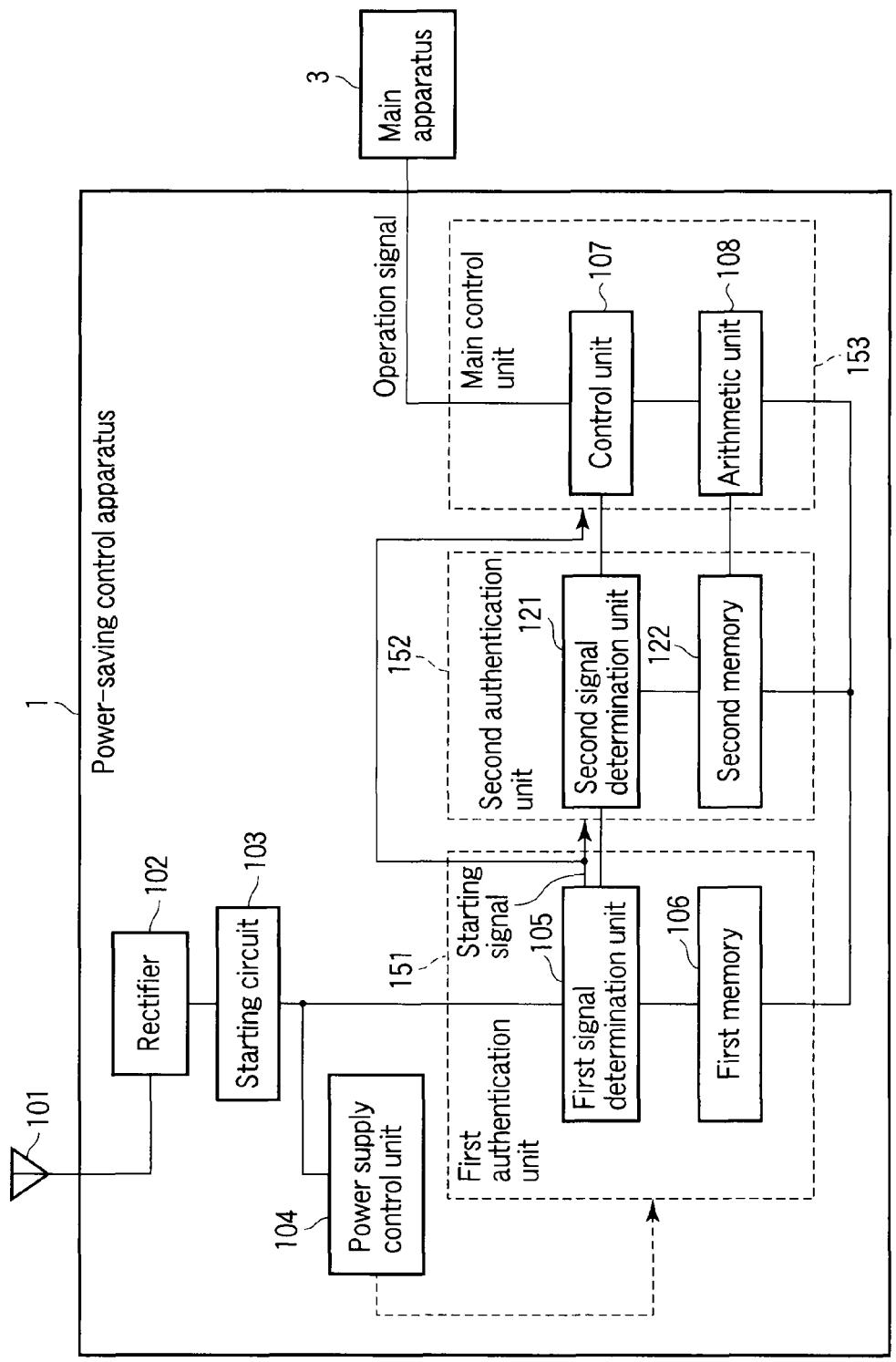
F I G. 11

| Authentication No. | First authentication code | Second authentication code |
|---|---|---|
| 100 | T(25) | H(100) |
| 99 | T(25) | H(99) |
| 98 | T(25) | H(98) |
| 97 | T(25) | H(97) |
| 96 | T(24) | H(96) |
| 95 | T(24) | H(95) |
| ... | ... | ... |
| 4 | T(1) | H(4) |
| 3 | T(1) | H(3) |
| 2 | T(1) | H(2) |
| 1 | T(1) | H(1) |

Nmax=4 (applies to groups of first authentication codes and second authentication codes)

F I G. 12

POWER SAVING CONTROL APPARATUS AND METHOD

CROSS-REFERENCE TO RELATED APPLICATIONS

This application is based upon and claims the benefit of priority from prior Japanese Patent Application No. 2007-298417, filed Nov. 16, 2007, the entire contents of which are incorporated herein by reference.

BACKGROUND OF THE INVENTION

1. Field of the Invention

The present invention relates to a power-saving control apparatus for electronic equipment (a main apparatus).

2. Description of the Related Art

In authentication using S/Key (registered trademark) described in reference 1 (Haller, N., "The S/KEY One•Time Password System", ISOC, 1994), which is a one-time password scheme which changes an authentication code every time authentication succeeds, an authentication code is always synchronized to feed back authentication OK/NG from an authentication apparatus to an authentication target apparatus. When, however, authentication is performed by a one-time password scheme such as S/Key (registered trademark) in a case in which only one-way communication from an authentication target apparatus to an authentication apparatus (the power-saving control apparatus) can be performed, since there is no synchronization means (a means for transmitting an acknowledgement indicating the success of authentication from the authentication apparatus to the authentication target apparatus), an authentication code may lose synchronization.

In order to correct a synchronization loss (=time offset), one-time password authentication based on a time synchronization scheme uses a method of holding, in advance, candidates of a plurality of authentication codes by which an authentication apparatus determines authentication OK. For example, there is available SecurID (registered trademark) as an authentication token available from RSA Security disclosed in reference 2 ("RSA SecurID", [online], [searched on Oct. 26, 2007], Internet <URL: http://www.rsa.com/node.aspx?id=1156>).

When, however, the power-saving control apparatus is to perform collation with many authentication codes, the circuit size and power consumption increase. When an apparatus designed to perform signal collation using a very weak power of nearly "0" is to perform collation with a plurality of authentication codes, the number of authentication codes to be verified needs to be minimized to minimize the circuit size and power consumption.

As described above, there has been the problem that performing collation with many authentication codes results in increases in circuit size and power consumption.

BRIEF SUMMARY OF THE INVENTION

According to an aspect of the present invention, a power-saving control apparatus includes:

a memory to store first to Nth (N is a natural number not less than two) different authentication codes;

a reception unit configured to receive a radio operation signal including an authentication code;

a determination unit configured to determine, every time the reception unit receives the radio operation signal, whether the authentication code in the radio operation signal is a valid code which matches one of the authentication codes stored in the memory;

an output unit configured to output an operation signal to a main apparatus when the determination unit determines that the authentication code in the radio operation signal is the valid code;

a counter to count the number of times the authentication code in each radio operation signal received by the reception unit matches a first authentication code of the authentication codes stored in the memory; and a control unit configured to generate a new authentication code, when (a) a value of the counter is equal to a predetermined set value or (b) the authentication code in the radio operation signal matches a second or subsequent authentication code of the authentication codes stored in the memory, to delete at least one of the authentication codes stored in the memory, and to store the new authentication code in the memory.

According to another aspect of the present invention, a power-saving control apparatus includes:

a first memory to store first to Nth (N is a natural number not less than two) different first authentication codes;

a second memory to store first to Mth (M is a natural number not less than two) different second authentication codes;

a reception unit configured to receive (a) a radio operation signal including a first authentication code and a second authentication code or (b) a radio operation signal including the first authentication code and a radio operation signal including the second authentication code;

a first determination unit configured to determine, every time the reception unit receives the radio operation signal, whether the first authentication code in the radio operation signal is a valid code which matches one of the first authentication codes stored in the first memory;

a second determination unit configured to be started when the first determination unit determines that the first authentication code in the radio operation signal is the valid code, and to determine whether the second authentication code in the radio operation signal received is a valid code which matches one of the second authentication codes stored in the second memory;

an output unit configured to output an operation signal to a main apparatus when the second determination unit determines that the second authentication code in the radio operation signal is the valid code;

a first control unit configured to generate a new second authentication code, every time the second determination unit determines that the second authentication code in the radio operation signal received is the valid code, to delete at least one of the second authentication codes stored in the second memory, and to store the new second authentication code in the second memory;

a counter to count the number of times the first authentication code in each radio operation signal received matches a first one of the first authentication codes stored in the first memory; and a second control unit to generate a new first authentication code, when (a) a value of the counter is equal to a predetermined set value or (b) the first authentication code in the radio operation signal matches a second or subsequent one of the first authentication codes stored in the first memory, to delete at least one of the first authentication codes stored in the first memory, and to store the new first authentication code in the first memory.

BRIEF DESCRIPTION OF THE SEVERAL VIEWS OF THE DRAWING

FIG. 3 is a circuit diagram showing an example of the arrangement of a rectifier;

FIG. 4 is a circuit diagram showing an example of the arrangement of a starting circuit;

FIG. 11 is a block diagram showing an example of the arrangement of a power-saving control apparatus according to the second embodiment;

FIG. 12 is a view showing authentication codes to be used when the power-saving control apparatus authenticates an operation terminal;

DETAILED DESCRIPTION OF THE INVENTION

The embodiments of the present invention will be described below with reference to the views of the accompanying drawing.

First Embodiment

Figure 1:
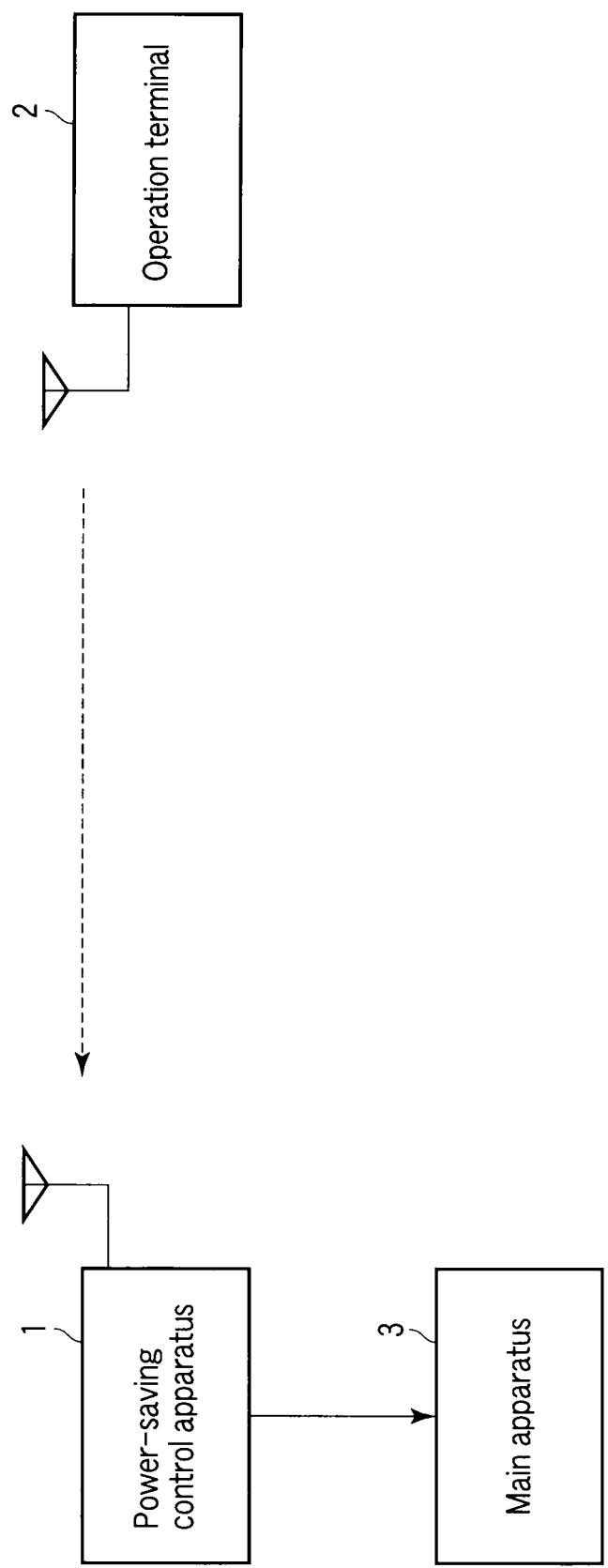
FIG. 1 is a block diagram showing an example of the schematic arrangement of an overall system including a power-saving control apparatus, an operation terminal, and a main apparatus.

FIG. 1 conceptually shows the relationship between a power-saving control apparatus 1 according to the first embodiment and related peripheral devices. An operation terminal 2 is a wireless terminal for operating the power-saving control apparatus 1 with radio signals. A main apparatus 3 is electronic equipment whose power is to be controlled by the power-saving control apparatus 1. When, for example, the power-saving control apparatus 1 is to be used for the remote control reception unit of a TV receiver, the main apparatus 3 corresponds to the TV receiver main body, the operation terminal 2 corresponds to a remote controller which operates the TV receiver via radio waves, and the power-saving control apparatus 1 corresponds to a unit which operates the power supply of the remote control reception unit or TV receiver. Note that the power-saving control apparatus 1 can be applied to any electronic equipment and electric equipment designed to be remotely operated by radio signals, e.g., a lighting apparatus, air conditioner, communication terminal, communication base station, computer, and automobile, in addition to a TV receiver.

Figure 2:
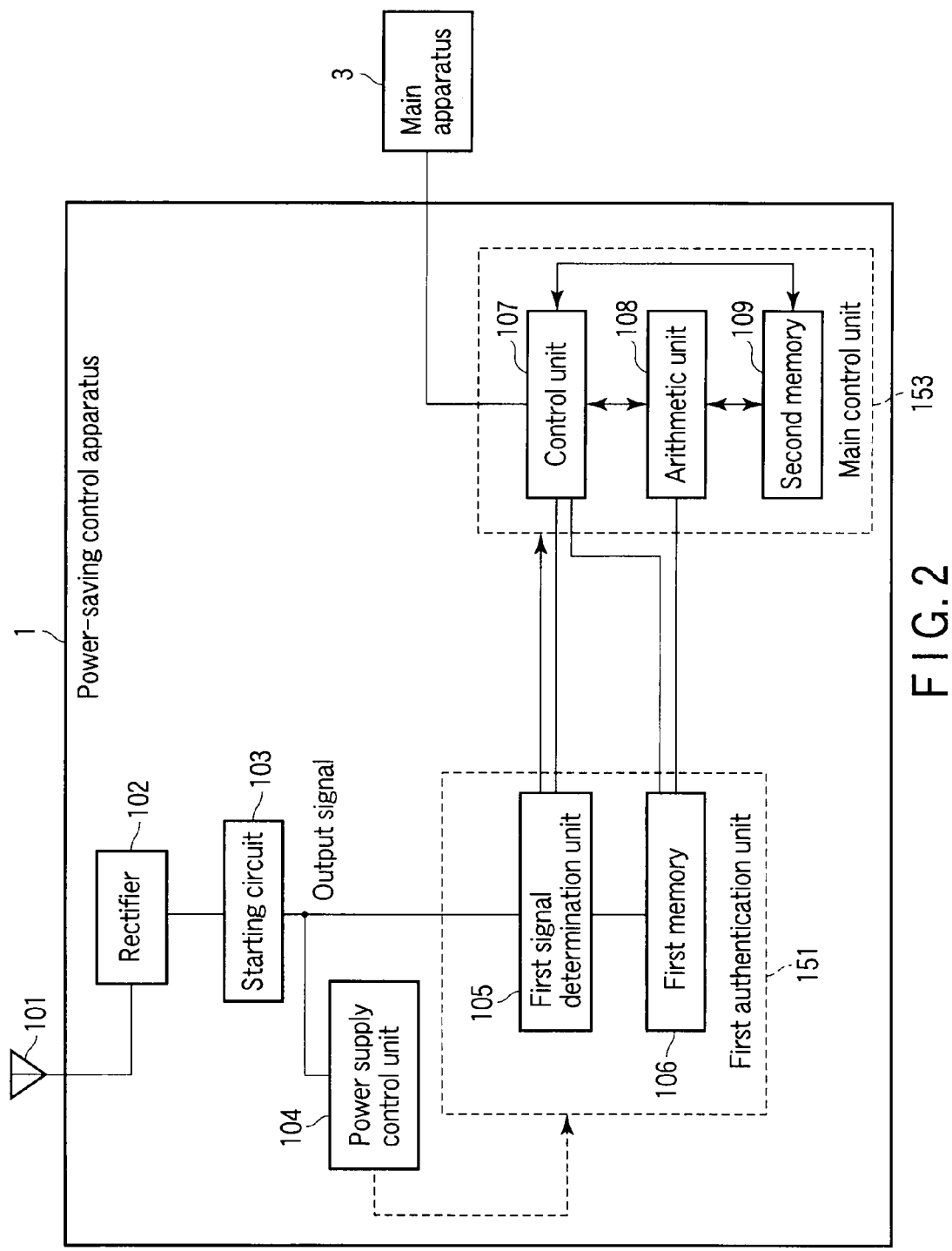
FIG. 2 is a block diagram showing an example of the arrangement of a power-saving control apparatus according to the first embodiment.

As shown in FIG. 2, the power-saving control apparatus 1 includes an antenna 101, a rectifier 102, a starting circuit 103, a power supply control unit 104, a first authentication unit 151, and a main control unit 153. The first authentication unit 151 includes a first signal determination unit 105 and a first memory 106. The main control unit 153 includes a control unit 107, an arithmetic unit 108, and a second memory 109.

The antenna 101 receives a radio signal having a specific frequency from the operation terminal 2.

When the antenna 101 matched to a specific frequency receives an incoming radio wave while the power supply of the power-saving control apparatus 1 is off, at least the power supply of the first authentication unit 151 of the power-saving control apparatus 1 is turned on by the functions of the rectifier 102, starting circuit 103, and power supply control unit 104.

The rectifier 102 receives the RF signal output from the antenna 101 which has received the signal transmitted from the operation terminal 2.

The rectifier 102 generates a rectified voltage (DC voltage) by rectifying the RF signal output from the antenna 101. That is, the antenna 101 and the rectifier 102 constitute a power generator which generates power upon receiving external energy. Note that power need not be supplied to the rectifier 102 (this will be described in detail later), as shown in FIG. 3. Note, however, that the starting circuit 103 is connected to only ground of the rectifier 102 for a potential reference.

The starting circuit 103 outputs a signal whose level (high/low) varies in accordance with the rectified voltage output from the rectifier 102. This output signal is supplied to the power supply control unit 104 and the first signal determination unit 105.

The power supply control unit 104 is a power switch which on/off-controls the power supply of the first authentication unit 151. Once the power supply control unit 104 receives an output signal from the starting circuit 103, the power supply control unit 104 can hold the power supply in an ON state. When the first authentication unit 151 is turned on, the first signal determination unit 105 and the first memory 106 operate.

The output of a current/voltage converter 12 of the starting circuit 103 varies in output level (high/low) in accordance with the first authentication code portion of a radio operation signal following the preamble portion of the signal received by the antenna 101. Upon receiving an output signal from the current/voltage converter 12, the first signal determination unit 105 compares this signal with a plurality of first authentication codes recorded in the first memory 106 to determine whether the signal is a valid authentication code which matches one of the plurality of first authentication codes. Upon determining that an output signal corresponding to the first authentication code from the current/voltage converter 12 of the starting circuit 103 matches one of the first authentication codes stored in the first memory 106 and is determined as a valid authentication code (i.e., if first authentication succeeds), the first signal determination unit 105 outputs a starting signal for starting the main control unit 153 (the control unit 107, arithmetic unit 108, and second memory 109). If the output signal does not match any of the first authentication codes stored in the first memory 106 and is not determined as a valid authentication code, i.e., is determined as invalid (that is, if first authentication fails), the starting signal is not output (the control unit 107, arithmetic unit 108, and second memory 109 are not started). A code used as a starting signal is a design item which is arbitrarily designed.

The first memory 106 is used to store a first authentication code, and comprises a storage device such as a flash memory which can store information even if power is not supplied.

The first memory 106 stores two codes different from the first authentication code to allow authentication with the next authentication code when a synchronization loss occurs. Note that the number of first authentication codes to be stored is not limited to one, and a plurality of codes are preferably stored. The reason why a plurality of codes are stored is that when some of the signals from the operation terminal 2 cannot reach the power-saving control apparatus 1 (authentication code synchronization losses occur), the next authentication code may be transmitted as the first authentication code from the operation terminal 2. A concrete example of this will be described later.

The control unit 107 starts upon receiving a starting signal from the first signal determination unit 105, and outputs an operation signal to the main apparatus 3. The control unit 107 also instructs the arithmetic unit 108 to calculate the first authentication code to be stored in the first memory 106.

The arithmetic unit 108 generates a new first authentication code on the basis of secret key information and a random number stored in the second memory 109, and records the code in the first memory 106. An arbitrary calculation algorithm can be used to generate an authentication code. For example, it suffices to use an encryption algorithm such as DES, 3DES, or AES. Secret key information and a random number are codes shared by the power-saving control apparatus 1 and the operation terminal 2, and the lengths, types, and contents of the codes are arbitrary. In some cases, however, the length of a code is limited for each calculation algorithm to be used to generate an authentication code. If, for example, DES is used as a calculation algorithm, a 56-bit code is used as secret key information, and a code having a length of an integer multiple of 64 bits is used as a random number.

A one-way Hash function such as MD5, SHA1, or SHA256 can be used as a calculation algorithm. In this case, the second memory 109 need not hold any secret key information, and a random number may be held. The length and type of a code to be used as a random number are arbitrary as in the case in which an encryption algorithm is used.

The second memory 109 holds secret key information, a random number, and a first authentication code counter which are necessary when the arithmetic unit 108 generates an authentication code. The secret key information and random number are similar to those described above, and it suffices to hold necessary information on the basis of an algorithm for generating an authentication code.

The control unit 107 adds "1" to the value of the first authentication code counter (to be referred to as N hereinafter) for first authentication code when authentication succeeds with the first authentication code. When the counter value reaches a predetermined value (to be referred to as Nmax hereinafter), the control unit 107 sets the counter value N to "1", and updates the first authentication code held in the first memory 106.

Note that this embodiment is not limited to the case in which the counter value is recorded in the second memory 109. Any form can be used as long as it is possible to count a predetermined number of times the same first authentication code is used. For example, it suffices to add a value other than "1" to N when authentication succeeds with the first authentication code or set N to a value other than "1" when the number of times counted reaches a predetermined number of times the same authentication code is used (e.g., N=Nmax, and "1" may be subtracted from N when authentication succeeds).

The power consumed by the control unit 107, arithmetic unit 108, second memory 109, and main apparatus 3 can be obtained from outside the power-saving control apparatus 1, e.g., a power line, dry battery, or storage battery. The main control unit 153 includes a switch which turns on/off an external power supply such as a power line or a battery. When the power supply is in an OFF state (a standby state), the switch is turned on (the power supply is turned on) upon reception of the starting signal output from the first signal determination unit 105, and the main control unit 153 operates. When a series of processes are complete, the switch is turned off, and the power supply is turned off.

FIG. 3 shows an example of the arrangement of the rectifier 102. The rectifier 102 has a series connection arrangement of nMOS transistors MR1 and MR2. The gate and source of each transistor are short-circuited (i.e., the transistors MR1 and MR2 are kinds of diode-connected transistors). An RF signal is input from the antenna 101 to the intermediate node between these transistors via a capacitor C1. A smoothing capacitor C2 is connected in parallel with the transistors MR1 and MR2 to generate an output voltage (rectified voltage) between the drain of the transistor MR1 and the source of the transistor MR2.

With this arrangement, a half-wave current originating from the RF input flows through the route of the transistor MR1, capacitor C2, and transistor MR2, and a DC voltage (rectified voltage) is generated across the capacitor C2. As a consequence, a lower terminal DC− in FIG. 3 is connected to ground, and an upper terminal DC+ in FIG. 3 is connected as the output terminal of the rectifier 102 to the starting circuit 103.

FIG. 4 shows an example of the arrangement of the starting circuit 103. The starting circuit 103 includes a current generating unit/current amplifying unit 11, the current/voltage converter 12, and a battery power supply 13. The current generating unit corresponds to an nMOS transistor M1. When the rectified voltage output from the rectifier 102 is applied between the drain/gate common connection side and source side of the transistor M1 with reference to ground (a reference potential or a second reference potential), a current is generated in the current generating unit 11. The current amplifying unit corresponds to an nMOS transistor M2 and pMOS transistors M3 and M4. The transistor M1 and the transistor M2 which form a current mirror circuit CM1 together with the transistor M1 perform first-stage current amplification, and a current mirror circuit CM2 constituted by the transistors M3 and M4 performs second-stage current amplification.

The amplified current output from the current generating unit/current amplifying unit 11 is output from the drain of the transistor M4 and input to the current/voltage converter 12. The current/voltage converter 12 generates a voltage corresponding to the magnitude of the input current. The polarity directed from a current input to an output voltage can be positive or negative depending on the arrangement after a power supply control unit 24. The reason why the ground side of the current/voltage converter 12 is indicated by the solid line, and the power supply (the second reference potential or the reference potential) side is indicated by the broken line is that connection on the power supply side may not be required. The battery power supply 13 functions as the power supply of the starting circuit 103. The battery power supply 13 functions as the power supply of the main control unit 153 (the control unit 107, arithmetic unit 108, and second memory 109).

The starting circuit 103 does not basically consume the power from the battery power supply 13 while no rectified voltage is input from the rectifier 102. This is because, while no rectified voltage is generated, since no current flows in the transistor M1, no current flows in the current mirror circuits CM1 and CM2. In addition, the current/voltage converter 12 comprises, for example, a CMOS circuit and the like, and since its state is fixed, no current flows.

The situation about power consumption in the control unit 107, arithmetic unit 108, and second memory 109 is the same as that in the current/voltage converter 12. This is because the current/voltage converter 12 can comprise, for example, a CMOS circuit.

The main apparatus 3 starts to consume power when turned on via, for example, the control unit 107, but consumes no power while being in an OFF state.

In this embodiment, since a potential difference V1 between the rectifier 102 and ground is made equal to a potential difference V2 between the current mirror circuit CM1 and ground, no current flows in the components while they are in an OFF state. This can effectively suppress power consumption in a standby state.

As described above, the power-saving control apparatus 1 and the main apparatus 3 shown in FIG. 1 basically consume no power in a standby state (in a power-off state). This is a great advantage in terms of power saving. Only when the antenna 101 receives radio waves and the rectifier 102 generates a rectified current does the starting circuit 103 consume power. When the power supply control unit 104 turns on the first authentication unit 151 in accordance with an output signal from the starting circuit 103, the power-saving control apparatus 1 consumes power. Even in this state, when radio waves stop arriving, the power consumption in the power-saving control apparatus 1 can be reduced to zero.

Referring to FIG. 4, when the first-stage current mirror circuit CM1 comprises nMOS transistors and an input current flows in them, the circuit operates. Therefore, as shown in FIG. 3, the upper terminal (positive terminal) of the rectifier 102 connected to this circuit is an output terminal for a rectified voltage.

Figure 5:
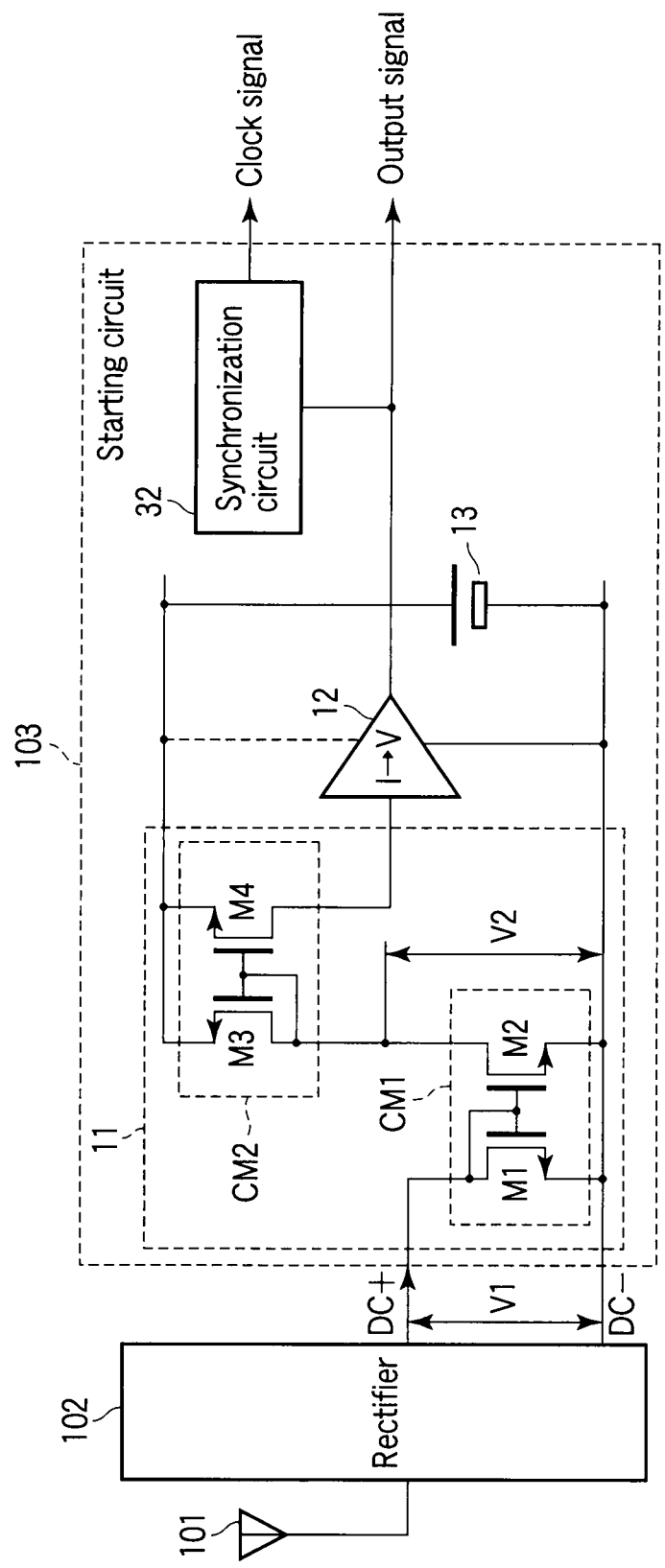
FIG. 5 is a circuit diagram showing another example of the arrangement of the starting circuit.

FIG. 5 shows another example of the arrangement of the starting circuit 103. The same reference numerals as in FIG. 4 denote the same parts in FIG. 5, and only different portions will be described. That is, referring to FIG. 5, a synchronization circuit 32 is connected to the output of the current/voltage converter 12. The synchronization circuit 32 operates when, for example, the power supply control unit 104 sets the power-saving control apparatus 1 in an ON state.

The synchronization circuit 32 generates a clock signal with a predetermined frequency and a predetermined timing in synchronism with the output level variation period of the current/voltage converter 12. The synchronization circuit 32 incorporates, for example, a PLL. When, for example, the power supply control unit 104 causes the synchronization circuit 32 to operate, an output from the current/voltage converter 12 subsequently varies at a given period corresponding to the preamble portion of a radio operation signal. The synchronization circuit 32 generates a clock signal in synchronism with this period. The first signal determination unit 105 may be configured to operate on the basis of the clock signal generated by the synchronization circuit 32.

Figures 6, 7:
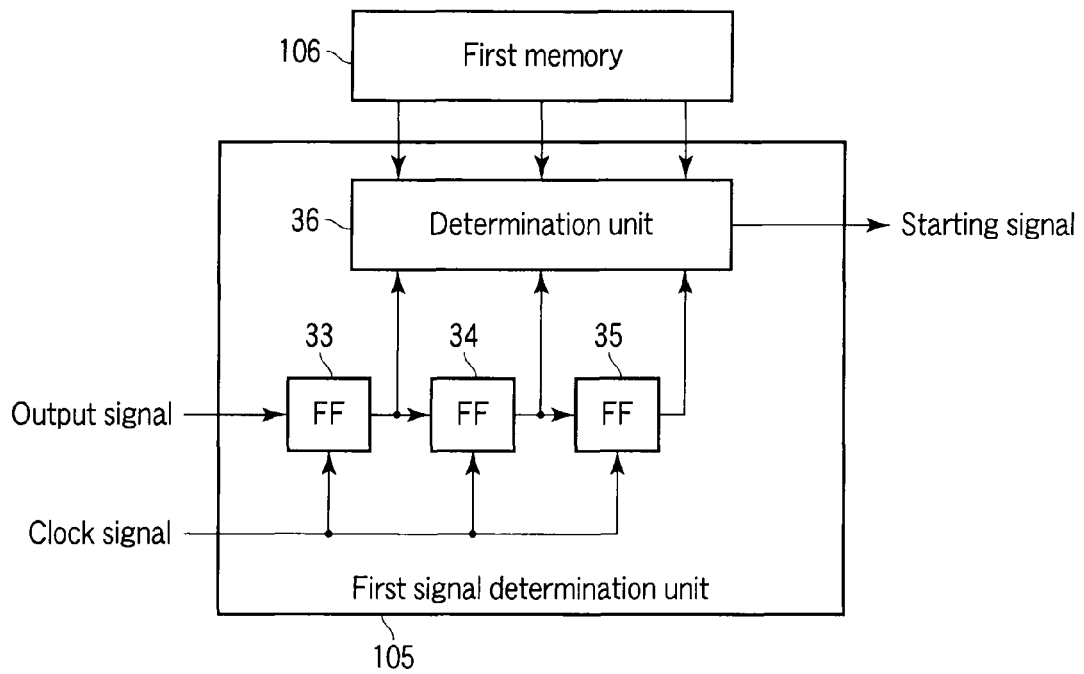
FIG. 6 is a block diagram showing an example of the arrangement of a first signal determination unit.
FIG. 7 is a view showing authentication codes used when the power-saving control apparatus authenticates an operation terminal.

FIG. 6 shows an example of the arrangement of the first signal determination unit 105. The following exemplifies a case in which the starting circuit 103 includes the synchronization circuit 32, as shown in FIG. 5.

Referring to FIG. 6, flip-flops 33, 34, and 35 constitute a shift register. This shift register performs a shifting operation in response to a clock signal from the synchronization circuit 32. When, for example, the power supply control unit 104 causes the flip-flops 33, 34, and 35 to operate, the output level (high/low) of the output of the current/voltage converter 12 varies in accordance with the first authentication code portion of a radio operation signal which follows a preamble portion. This variation history is stored in the flip-flops (FFs) 33, 34, and 35 constituting the shift register. The stored variation history is sent to a determination unit 36.

As described above, the first memory 106 holds a first authentication code in advance. When, for example, a power supply control unit 104 sets the first memory 106 in an operative state, the first authentication code is read out and sent to the determination unit 36.

The determination unit 36 compares information from the flip-flops 33, 34, and 35 with information from the first memory 106. If they match each other, the determination unit 36 outputs a starting signal to the control unit 107.

Note that the number of flip-flops 33, 34, and 35 (shift register) is not limited to three as in this case, and can be increased in accordance with the information amount of authentication codes.

FIG. 7 shows authentication codes to be used when the power-saving control apparatus 1 authenticates the operation terminal 2.

According to the S/Key (registered trademark) scheme, every time authentication succeeds, an authentication code is changed. In this embodiment, one authentication code is used until authentication succeeds by a predetermined number of times Nmax. For example, FIG. 7 shows a case in which an authentication code is changed every time authentication succeeds four times (i.e., Nmax=4). Authentication code T(25) is used from No. 100 to No. 97, and authentication code T(24) is used from No. 96 to No. 93. Subsequently, an authentication code is changed every time authentication succeeds four times. Note that the number of times Nmax authentication is performed with the same authentication code may be set at most to the maximum number of times a synchronization loss is expected to occur.

The number of times Nmax can be determined based on how many times a synchronization loss occurs between the power-saving control apparatus 1 and the operation terminal 2 which are installed in an operating environment. The number of times is measured when the power-saving control apparatus 1 and the operation terminal 2 are installed in a typical operating environment at the stage of design, by using a function of measuring the number of times of synchronization losses (to be referred to as a calibration function hereinafter) in the power-saving control apparatus 1 and the operation terminal 2, or by using the calibration function of power-saving control apparatus 1 and the operation terminal 2 when the apparatus starts to operate or an operating environment changes upon change of the installation place of the apparatus.

The present invention does not claim the use of any specific one of the methods of determining the number of times Nmax. As the number of times Nmax authentication is performed with the same authentication code increases, the risk of a replay attack increases. Therefore, it is preferable to minimize the number of times.

When, for example, the operation terminal 2 is used as a remote controller for the main apparatus 3, a first authentication code like that shown in FIG. 7 is transmitted every time the power button of the remote controller is pressed. The power-saving control apparatus 1 performs authentication by using the received first authentication code. If authentication succeeds, the power-saving control apparatus 1 turns on the power supply of the main apparatus 3.

The operation terminal 2 transmits a first authentication code like that shown in FIG. 7 to the power-saving control apparatus 1. The power-saving control apparatus 1 performs authentication by using the received first authentication code.

The arrangement of the operation terminal 2 is irrelevant to the gist of the present invention, and hence will be briefly described. The operation terminal 2 can comprise an arithmetic unit for generating a first authentication code, a memory which holds secret key information, a power supply such as a battery, operation buttons, and an operation window such as a touch panel. Alternatively, the operation terminal 2 may hold an authentication code list and authentication code sequences in a memory in advance instead of comprising an arithmetic unit.

The processing operation of the power-saving control apparatus 1 in FIG. 2 will be described next with reference to FIG. 8.

The power-saving control apparatus 1 stands by in a power-off state until a radio wave (radio operation signal) reaching the level of detection sensitivity arrives. When the antenna 101 receives the radio operation signal which is transmitted from the operation terminal 2 and reaches the level of detection sensitivity (step S1), the power supply of the first authentication unit 151 is turned on by the functions of the rectifier 102, starting circuit 103, and power supply control unit 104 and is set in an operative state.

If the starting circuit 103 has an arrangement like that shown in FIG. 5, since the output voltage of the current/voltage converter 12 varies in accordance with the preamble portion of the radio operation signal, the synchronization circuit 32 outputs a clock signal synchronized with this variation period to the first signal determination unit 105.

The current/voltage converter 12 then outputs a signal corresponding to the authentication code portion (following, for example, the preamble) of the radio operation signal to the first signal determination unit 105 (step S2).

The first signal determination unit 105 compares the input signal with a first authentication code held in the first memory 106 (step S3). If they match each other (YES in step S3), the first signal determination unit 105 outputs a starting signal to the main control unit 153. The main control unit 153 (the control unit 107, arithmetic unit 108, and second memory 109) receives this starting signal and is set in a power-on state. Upon receiving this starting signal, the control unit 107 outputs an operation signal to the main apparatus 3 (step S5).

The control unit 107 then determines, on the basis of the signal input from the starting circuit 103 to the first signal determination unit 105, whether it is necessary to update the information held in the first memory 106. If at least one of the following two conditions, i.e., (condition a1) and (condition a2), is satisfied, the control unit 107 determines that it is necessary to update the first memory 106 (step S6).

(condition a1): The counter value N held in the second memory 109 matches Nmax ("4" in this case).

(condition a2): The signal input to the first signal determination unit 105 matches the second one of a plurality of (two in this case) first authentication codes.

If the control unit 107 determines that it is necessary to update (YES in step S6), the counter value N in the second memory 109 is updated to "1" (step S7). The arithmetic unit 108 calculates a new first authentication code (step S8). The first memory 106 stores it (step S9). For example, the first one of a plurality of (two in this case) first authentication codes held in the first memory 106 is deleted, and the new first authentication code is stored in the first memory 106. Note that if three or more first authentication cods are stored in the first memory 106 and (condition a2) described above is satisfied, all codes before the matched authentication code can be deleted.

If the control unit 107 determines in step S6 that neither of the two conditions is satisfied, the process advances to step S11 to increment the counter value in the second memory 109 by one to update the counter value to "N+1" (step S11).

The control unit 107 can include, for example, a timer. When the timer measures the elapsed time from the reception of a starting signal and a predetermined time has elapsed since the reception of the starting signal, the control unit 107 can automatically turn off the power supply of the main control unit 153 (the control unit 107, arithmetic unit 108, and second memory 109).

In addition, the power supply control unit 104 can include, for example, a timer. When the timer measures the elapsed time after the power supply of the first authentication unit 151 is turned on, and a predetermined time has elapsed after the power supply of the first authentication unit 151 is turned on, the power supply control unit 104 can turn off the power supply of the first authentication unit 151.

Figure 9:
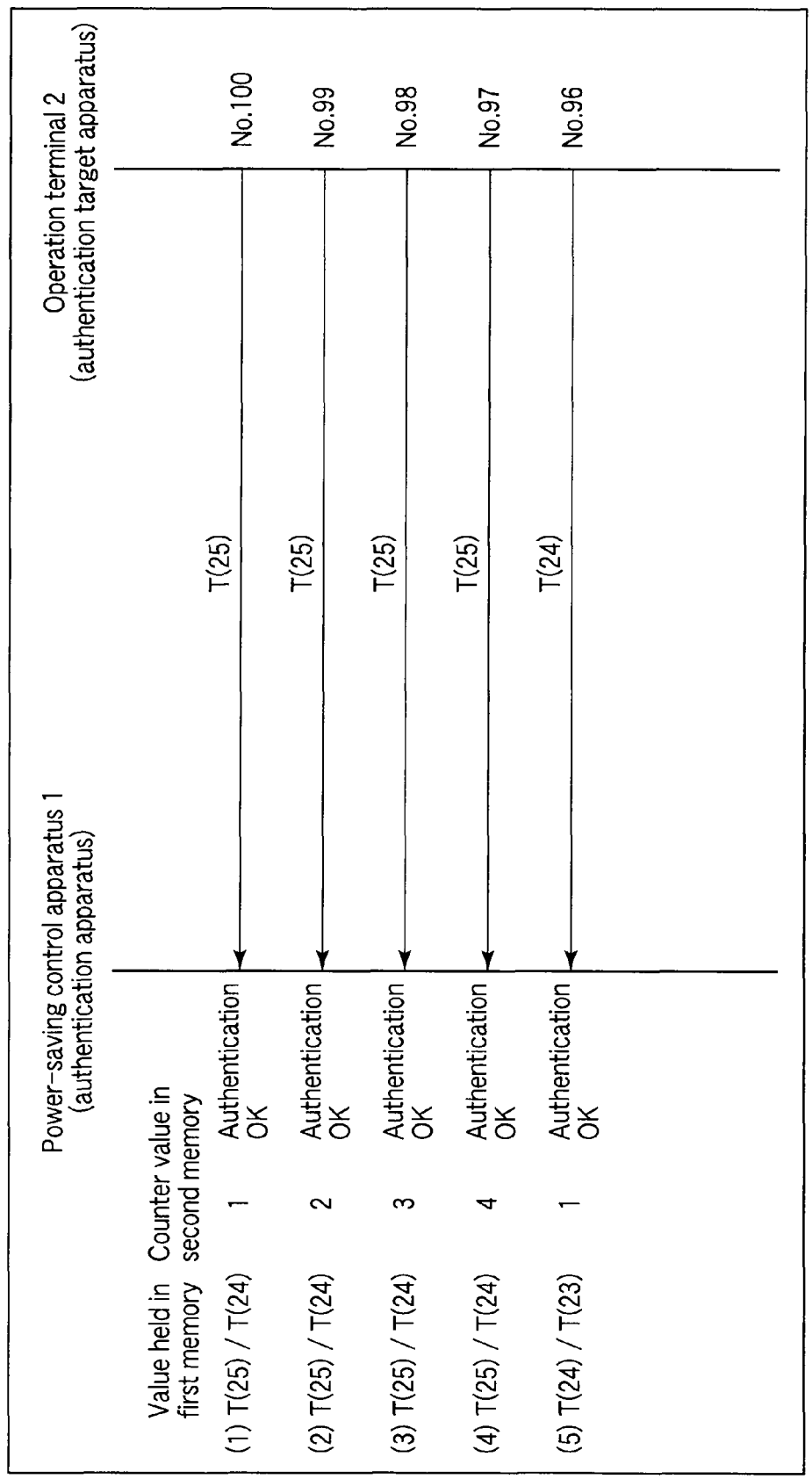
FIG. 9 is a view showing a communication sequence between the power-saving control apparatus and an operation terminal without any synchronization loss.

The manners in which authentication is performed when no synchronization loss has occurred and when a synchronization loss has occurred will be described next with reference to FIGS. 9 and 10. FIG. 9 shows a communication sequence between the power-saving control apparatus 1 and the operation terminal 2 when no synchronization loss has occurred. In this case, the operation terminal 2 wirelessly transmits the authentication codes shown in FIG. 7 to the power-saving control apparatus 1 sequentially.

Assume that the counter value N in the second memory 109 is "1" and T(25) and T(24) are held as first authentication codes in the first memory 106 of the power-saving control apparatus 1.

Figure 8:
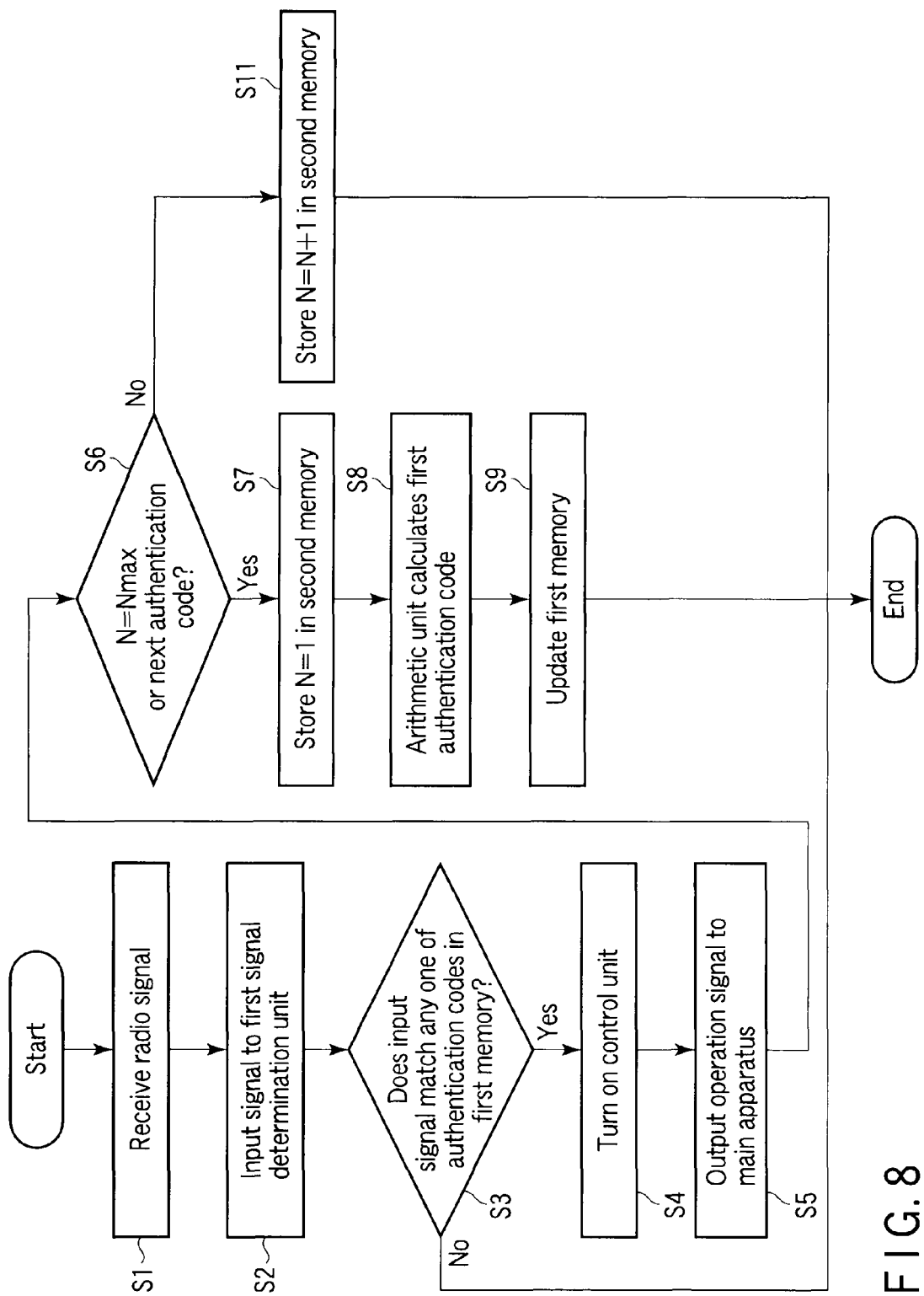
FIG. 8 is a flowchart for explaining processing operation to be performed when the power-saving control apparatus in FIG. 2 receives a radio signal.

The power-saving control apparatus 1 compares the first authentication code superimposed on a received radio signal with the two first authentication codes held in the first memory 106 (steps S1 to S3 in FIG. 8).

Referring to FIG. 9, since the operation terminal 2 transmits T(25) as a first authentication code up to No. 97 ((1) to (4) in FIG. 9), the code matches the first one T(25) of the first authentication codes held in the first memory 106 (step S3). In (1) to (3) in FIG. 9, steps S1 to S6 and S11 in FIG. 8 are performed.

In (4) in FIG. 9, if authentication at No. 97 succeeds, since N=Nmax=4 (step S6 in FIG. 8), the first memory 106 is updated (steps S7 to S9). The first authentication codes held in the updated first memory are T(24) and T(23) with T(25)

being deleted. This processing is repeated after No. 96 in the same manner, thereby executing authentication.

Figure 10:
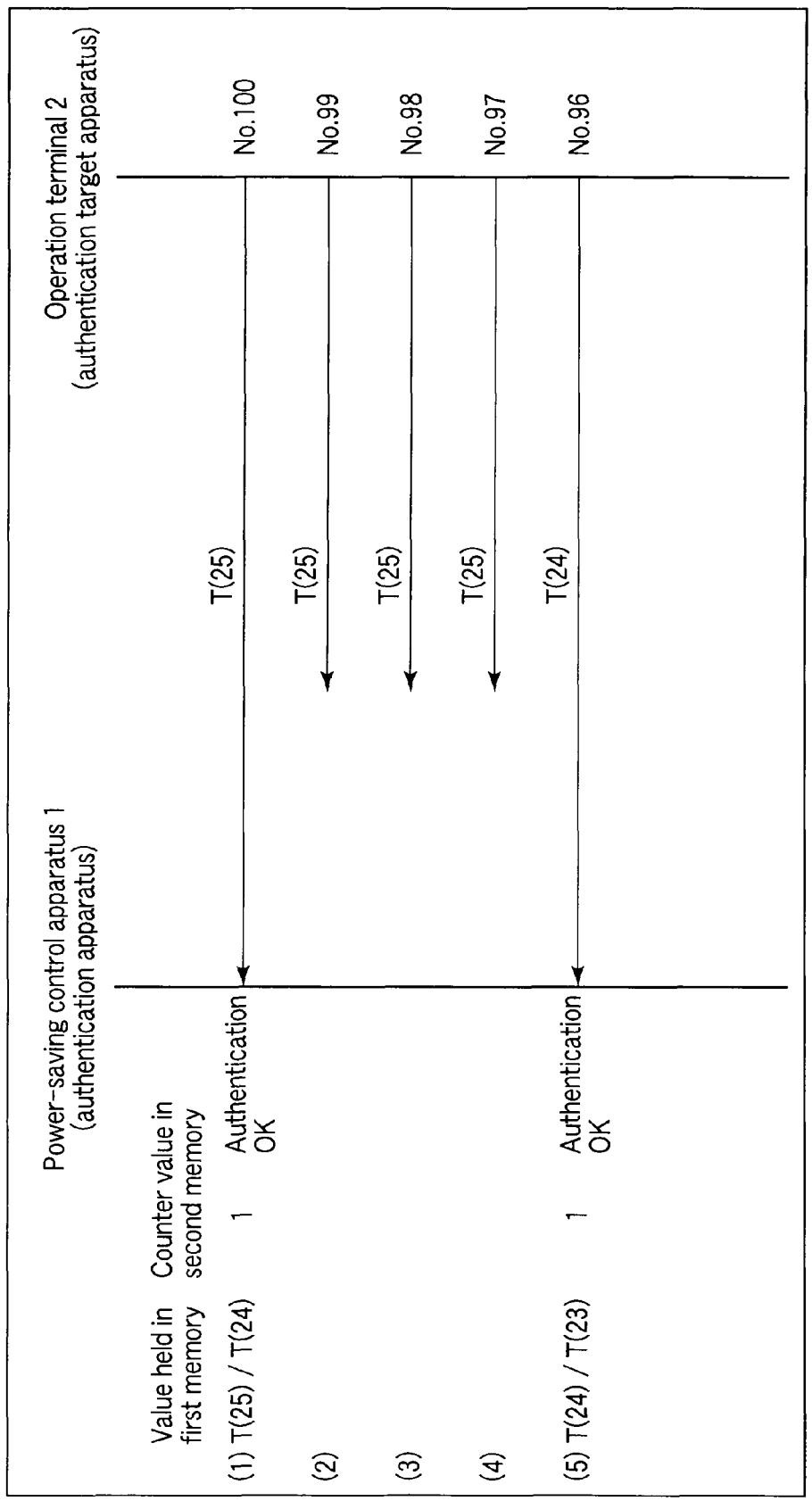
FIG. 10 is a view showing a communication sequence between the power-saving control apparatus and an operation terminal upon occurrence of a synchronization loss.

FIG. 10 shows a communication sequence between the power-saving control apparatus 1 and the operation terminal 2 when a synchronization loss has occurred. As in the case in FIG. 9, the operation terminal 2 wirelessly transmits the authentication codes shown in FIG. 7 to the power-saving control apparatus 1 sequentially.

When the counter value N in the second memory 109 is "1", T(25) and T(24) are held as first authentication codes in the first memory 106 of the power-saving control apparatus 1.

The power-saving control apparatus 1 compares the first authentication code superimposed on a received radio operation signal with the first authentication codes held in the first memory 106 (steps S1 to S3 in FIG. 8).

At No. 100 in (1) in FIG. 10, since the operation terminal 2 transmits T(25) as the first authentication code, the code matches the first one T(25) of the first authentication codes held in the first memory 106 (step S3). The process therefore advances to steps S4 to S6 and S11 in FIG. 8.

Assume that as indicated by (2) to (4) in FIG. 10, radio operation signals at No. 99, No. 98, and No. 97 transmitted from the operation terminal 2 do not reach the power-saving control apparatus 1, and a synchronization loss occurs. Assume also that as indicated in (5) in FIG. 10, thereafter, a radio operation signal at No. 96 has reached the power-saving control apparatus 1 (steps S1 and S2). In this case, the power-saving control apparatus 1 determines that the signal input to the first signal determination unit 105 matches the second one T(24) of the first authentication codes stored in the first memory 106 (step S3), and hence the process advances to steps S4, S5, and S6. In step S6, the power-saving control apparatus 1 determines that the signal input to the first signal determination unit 105 matches the second one of T(24) of the first authentication codes even though the counter value N in the second memory 109 has not reached Nmax ("4" in this case). The power-saving control apparatus 1 therefore executes steps S7 to S9 to update the first memory 106. As a result, the first authentication codes in the first memory 106 are updated to T(24) and T(23).

As shown in FIG. 10, even when a synchronization loss has occurred, if the number of times of synchronization losses is within Nmax−1, authentication can be continued.

In the flowchart of FIG. 9, a new first authentication code is generated (calculated) in step S9 when authentication succeeds. However, a first authentication code list like that shown in FIG. 7 and first authentication code sequences can be stored in a memory device such as the second memory 109 in advance, and the first memory 106 can be updated by the stored values.

According to the conventional technique, if the number of times of synchronization losses becomes Nmax−1, at least Nmax codes need to be held as first authentication codes. In contrast, in this embodiment, it suffices to hold two authentication codes at most, and hence the number of authentication code candidates to be stored in the first memory 106 can be decreased.

As described above, according to the first embodiment, using the same authentication code for a plurality of consecutive authentication processes can suppress the number of authentication codes to be stored in the first memory 106. As a result, the circuit size and power consumption can be minimized. In addition, even if the number of authentication codes to be stored in the first memory 106 is decreased, authentication can be continued even at the occurrence of a synchronization loss.

In addition, a radio operation signal can be received with a standby power of almost "0" by using the rectifier 102 which generates a rectified voltage by rectifying a radio operation signal received by the antenna 101 and the starting circuit 103 which generates a current upon receiving the rectified voltage, amplifies the current, and outputs a voltage signal corresponding to the magnitude of the amplified current. Using the rectifier 102 and the starting circuit 103 can further save power.

Second Embodiment

The same reference numerals as in FIG. 2 denote the same parts in FIG. 11, and only different portions will be described. Referring to FIG. 11, a second authentication unit 152 is added to this embodiment, and the second memory 109 is omitted from the main control unit 153. A second authentication unit 152 includes a second signal determination unit 121 and a second memory 122.

As in the first embodiment, a first signal determination unit 105 compares, for example, a signal corresponding to the first authentication code in a radio operation signal from an operation terminal 2 with a plurality of first authentication codes stored in a first memory 106. If the first authentication code in the radio operation signal matches one of a plurality of first authentication codes stored in the first memory 106 (i.e., the first authentication code in the radio operation signal is a valid authentication code), the first signal determination unit 105 outputs a starting signal for starting the second authentication unit 152 and a main control unit 153 to the second authentication unit 152 and the main control unit 153. An arbitrary code is used as a starting signal.

The power consumed by the second authentication unit 152 can be obtained from outside a power-saving control apparatus 1, e.g., a power line, dry battery, or storage battery. The second authentication unit 152 includes a switch which turns on/off an external power supply such as a power line or a battery. When the power supply is in an OFF state (a standby state), the switch is turned on (the power supply is turned on) upon reception of the starting signal output from the first signal determination unit 105, and the second authentication unit 152 operates. When a series of processing operations are complete, the switch is turned off, and the power supply is turned off.

The second signal determination unit 121 receives a signal corresponding to the second authentication code following the first authentication code in a radio operation signal from the operation terminal 2 via a rectifier 102, a starting circuit 103, and the first signal determination unit 105. The second signal determination unit 121 compares this signal with a plurality of second authentication codes stored in the second memory 122. If the second authentication code in the radio operation signal matches one of the plurality of second authentication codes in the second memory 122 (i.e., the second authentication code in the radio operation signal is valid), the second signal determination unit 121 notifies a control unit 107 of the corresponding information.

The second signal determination unit 121 can have, for example, the same arrangement as that of the first signal determination unit 105 shown in FIG. 6. In this case, the starting circuit 103 has an arrangement like that shown in FIG. 5, and the clock signal generated by a synchronization circuit 32 is also input to the second signal determination unit 121.

The second memory 122 is a storage device for storing secret key information, a random number, a counter which counts the number of times of authentication with the first authentication code up to Nmax, and a second authentication code, which are required for an arithmetic unit 108 to generate an authentication code, and comprises a storage device capable of holding information even if no power is supplied.

The second memory 122 holds a plurality of codes as second authentication codes to allow authentication with the next authentication code when a synchronization loss occurs. The number of codes to be held may be set to a maximum number+1. If, for example, a synchronization loss is allowed up to three times, the number of codes to be held is "4".

When the control unit 107 is started when, for example, receiving the starting signal output from the first signal determination unit 105, and is notified of the success of authentication with the second authentication code from the second signal determination unit 121, the control unit 107 outputs an operation signal to the main apparatus 3. The control unit 107 also instructs the arithmetic unit 108 to calculate a first authentication code to be stored in the first memory 106 and a second authentication code to be stored in the second memory 122.

The arithmetic unit 108 generates first and second authentication codes on the basis of the secret key information and random numbers stored in the second memory 122. The first and second memories 106 and 122 respectively store the generated first and second authentication codes.

The first authentication codes stored in the first memory 106 are the same as those in first embodiment, and hence a description of them will be omitted. The second authentication codes to be stored in the second memory 122 can also be generated by an encryption algorithm or a one-way Hash algorithm as in the first embodiment. However, the second authentication unit 152 can perform complicated processing by using more power than the first authentication unit 151, and hence is characterized by being capable of performing more sophisticated authentication than the first authentication unit 151. Sophisticated authentication includes, for example, authentication with a secret key, random number, and an authentication code longer than those in authentication executed by the first authentication unit 151, and authentication using a more sophisticated calculation algorithm. Note, however, that the degree of sophistication to which authentication is to be executed depends on how much safety is required. The technique for this authentication is a design item.

The power consumed by the control unit 107, arithmetic unit 108, and main apparatus 3 can be obtained from outside the power-saving control apparatus 1, e.g., a power line, dry battery, or storage battery. The main control unit 153 (the control unit 107 and the arithmetic unit 108) includes a switch which turns on/off an external power supply such as a power line or a battery. When the power supply is in an OFF state (a standby state), the switch is turned on (the power supply is turned on) upon reception of the starting signal output from the first signal determination unit 105, and the main control unit 153 operates. When a series of processing operations are complete, the switch is turned off, and the power supply is turned off.

FIG. 12 shows authentication codes to be used when a power-saving control apparatus 1 authenticates an operation terminal 2. The first authentication codes are the same as those described in the first embodiment. The second embodiment further uses second authentication codes. A second authentication code changes every time authentication succeeds, and hence is the same as that used in a one-time password scheme such as the S/Key scheme. The operation terminal 2 transmits a radio operation signal containing first and second authentication codes to the power-saving control apparatus 1. The power-saving control apparatus 1 performs authentication by using the first and second authentication codes in the received radio operation signal.

As in the first embodiment, when authentication succeeds with a first authentication code, the control unit 107 adds "1" to a value N of a first authentication code counter in the second memory 122.

When the counter value N reaches a predetermined number of times Nmax, the value of the counter is returned to "1", and the first authentication codes held in the first memory 106 are updated.

When authentication succeeds with a second authentication code, the control unit 107 updates the second authentication codes held in the second memory 122.

Figure 13:
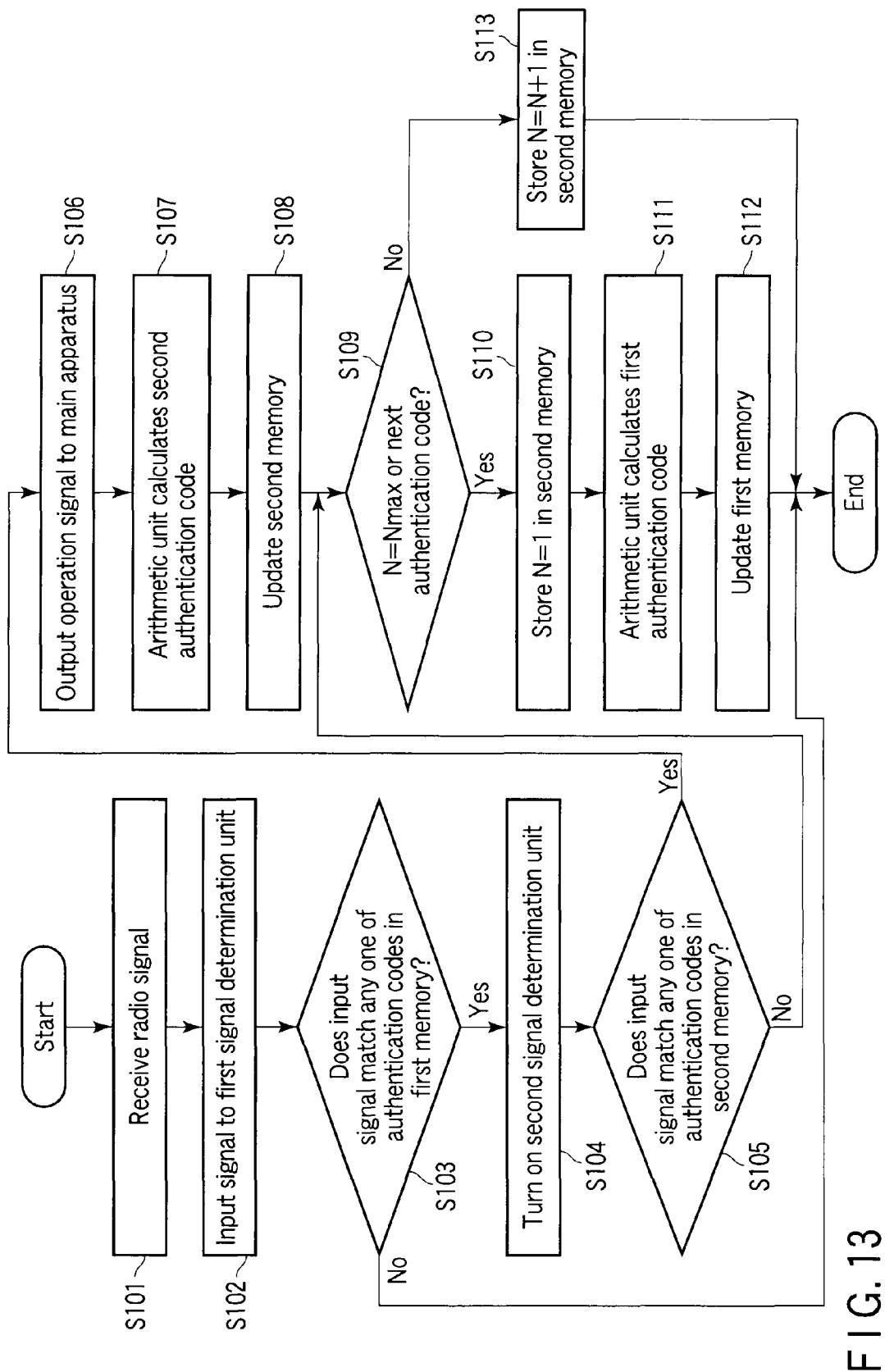
FIG. 13 is a flowchart for explaining the processing operation of the power-saving control apparatus in FIG. 11.

FIG. 13 is a flowchart for explaining a processing operation to be performed when the power-saving control apparatus 1 receives a radio signal. The processing operation of the power-saving control apparatus 1 in FIG. 11 will be described below with reference to FIG. 13.

The power-saving control apparatus 1 stands by in a power-off state until a radio wave (radio operation signal) reaching the level of detection sensitivity arrives. When an antenna 101 receives the radio operation signal which is transmitted from the operation terminal 2 and reaches the level of detection sensitivity (step S101), the power supply of the first authentication unit 151 is turned on by the functions of the rectifier 102, the starting circuit 103, and a power supply control unit 104, and the first authentication unit 151 is then set in an operative state. At this time, the power-saving control apparatus 1 receives a radio operation signal containing first and second authentication codes, a radio operation signal containing a first authentication code, or a radio operation signal containing a second authentication code.

When the starting circuit 103 has an arrangement like that shown in FIG. 5, since an output voltage from a current/voltage converter 12 varies in accordance with the preamble portion of a radio operation signal, a synchronization circuit 32 outputs a clock signal synchronized with the variation period to the first signal determination unit 105 and the second signal determination unit 121.

The current/voltage converter 12 outputs a signal corresponding to the first authentication code portion in a radio operation signal (which follows, for example, the preamble) to the first signal determination unit 105 (step S102).

The first signal determination unit 105 compares the input signal (the first authentication code in the radio operation signal) with a plurality of first authentication codes held in the first memory 106 (step S103). If the first authentication code in the radio operation signal matches one of the plurality of first authentication codes in the first memory 106 (i.e., the first authentication code in the radio operation signal is valid) (YES in step S103), the first signal determination unit 105 outputs a starting signal to the second authentication unit 152 and the main control unit 153. The power supply of the second authentication unit 152 is turned on when this starting signal is received (step S104). Upon reception of this starting signal, the control unit 107 and the arithmetic unit 108 are set in a power-on state.

The current/voltage converter 12 then outputs a signal corresponding to the second authentication code portion following the first authentication code in the radio operation signal or a signal corresponding to the second authentication code portion in the next radio operation signal to the second signal determination unit 121 via the first signal determination unit 105.

The second signal determination unit 121 compares the input signal (the second authentication code in the radio operation signal) with a plurality of second authentication codes held in the second memory 122 (step S105). If the second authentication code in the radio operation signal matches one of the plurality of second authentication codes in the second memory 122 (i.e., the second authentication code in the radio operation signal is valid) (YES in step S105), the second signal determination unit 121 notifies the control unit 107 of the corresponding information. Upon receiving this notification, the control unit 107 outputs an operation signal to the main apparatus 3 (step S106).

The control unit 107 then instructs the arithmetic unit 108 to calculate a new second authentication code so as to update the second authentication codes stored in the second memory 122. Upon receiving this instruction, the arithmetic unit 108 calculates a new second authentication code (step S107). The second memory 122 stores this code (step S108).

The control unit 107 then determines, on the basis of the signal input from the second signal determination unit 121, whether it is necessary to update the information held in the first memory 106. If at least one of the following two conditions, i.e., (condition b1) and (condition b2) is satisfied, the control unit 107 determines that it is necessary to update the first memory 106 (step S109).

(condition b1): The counter value N held in a second memory 109 matches Nmax ("4" in this case).

(condition b2): The signal input to the first signal determination unit 105 matches the second or subsequent authentication code of the plurality of (two in this case) first authentication codes held in the first memory 106.

If the control unit 107 determines that it is necessary to update (YES in step S109), the counter value N in the second memory 122 is returned to "1" (step S110). The arithmetic unit 108 calculates a new first authentication code (step S111). The first one of the first authentication codes is deleted from the first memory 106, and the new second authentication code is stored (step S112). Note that if three or more first authentication cods are stored in the first memory 106 and (condition b2) described above is satisfied, all codes before the matched authentication code can be deleted.

If the control unit 107 determines in step S109 that neither of the two conditions described above is satisfied, the process advances to step S113 to update the counter value in the second memory 122 to "N+1" by incrementing the counter value by one (step S113).

If the control unit 107 determines in step S105 after authentication succeeds with the first authentication code that the input signal to the second signal determination unit 121 matches one of the authentication codes stored in the second memory 122 (authentication succeeds with the second authentication code), the control unit 107 instructs the arithmetic unit 108 to calculate a second authentication code so as to update the second authentication codes stored in the second memory 122 regardless of (condition b1) and (condition b2) described above. If the control unit 107 determines in step S105 that authentication fails (NG) with the second authentication code, the control unit 107 does not update the second authentication codes in the second memory 122.

Note that in the flowchart of FIG. 13, the calculation of a first authentication code in step S111 or the calculation of a second authentication code in step S107 is executed after authentication using a first authentication code or a second authentication code. However, a first or second authentication code list like that shown in FIG. 12 and first or second authentication code sequences can be stored in a memory device such as the second memory 122 in advance, and the first memory 106 or the second memory 122 can be updated by reading out values from the storage device.

The control unit 107 can include, for example, a timer. When the timer measures the elapsed time from the reception of a starting signal and a predetermined time has elapsed since the reception of the starting signal, the control unit 107 can automatically turn off the power supply of the main control unit 153.

The second authentication unit 152 can include, for example, a timer. When the timer measures the elapsed time after the reception of a starting signal from the first authentication unit 151, and a predetermined time has elapsed after the reception of the starting signal, the power supply of the second authentication unit 152 can be automatically turned off.

The power supply control unit 104 can also include, for example, a timer. When the timer measures the elapsed time after the power supply of the first authentication unit 151 is turned on, and a predetermined time has elapsed after the power supply of the first authentication unit 151 is turned on, the power supply of the first authentication unit 151 can be turned off.

Note that step S107 of calculating a second authentication code and step S108 of updating the second memory can be executed upon the determination of YES in step S105, and hence processing need not always be performed exactly in accordance with the flowchart of FIG. 13. For example, steps S107 and S108 can be executed after steps S112 and S113.

Figure 14:
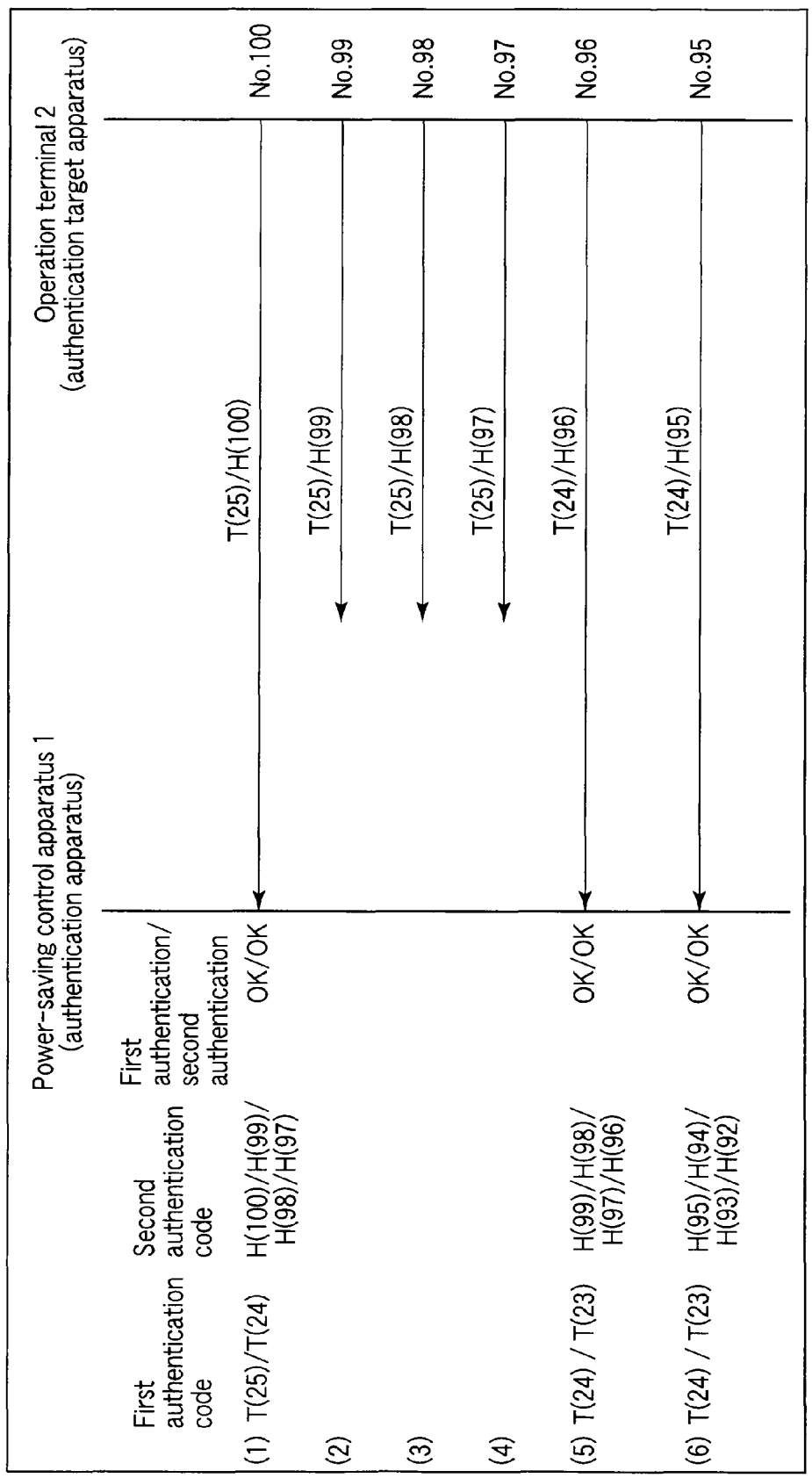
FIG. 14 is a view showing a communication sequence between the power-saving control apparatus and an operation terminal upon occurrence of a synchronization loss.

The manner of performing authentication at the occurrence of a synchronization loss will be described next with reference to FIG. 14. FIG. 14 shows a communication sequence between the power-saving control apparatus 1 and the operation terminal 2 when a synchronization loss has occurred. In this case, the operation terminal 2 wirelessly transmits the authentication codes shown in FIG. 12 to the power-saving control apparatus 1 sequentially. The first memory 106 of the power-saving control apparatus 1 holds T(25) and T(24) as first authentication codes. The second memory 122 holds H(100), H(99), H(98), and H(97) as second authentication codes.

In this case, the power-saving control apparatus 1 compares the authentication code superimposed on a received radio operation signal with the first authentication codes held in the first memory 106 (steps S101 to S103 in FIG. 13).

At No. 100 in (1) in FIG. 14, the operation terminal 2 transmits T(25) and T(100) as first and second authentication codes, respectively. Since the first authentication code in this radio operation signal matches first T(25) held in the first memory 106 (step S103), the second authentication unit 152 is started (step S104). Since the second memory 122 holds the authentication code which is determined to match second authentication code H(100) superimposed on the radio operation signal by the second signal determination unit 121 of the second authentication unit 152, the arithmetic unit 108 calculates a new second authentication code H(96) (step S107). The second memory 122 stores this code (step S108). At this time, the second memory 122 holds H(99), H(98), H(97), and H(96) as second authentication codes. The counter value in the second memory 122 is set to "2" (step S113).

Assume that, subsequently, as indicated by (2) to (4) in FIG. 14, radio signals at No. 99, No. 98, and No. 97 transmitted from the operation terminal 2 have not reached the power-saving control apparatus 1, and a radio operation signal at No. 96 has reached the power-saving control apparatus 1 after the occurrence of a synchronization loss, as indicated by (5) in FIG. 14. In this case, since the first authentication code in the received radio operation signal matches T(24) as the second one of the first authentication codes held in the first memory 106 (steps S101 to S103), the power-saving control apparatus 1 starts the second authentication unit 152 (step S104).

Since the second authentication code in the radio operation signal matches H(96) as the fourth one of the second authentication codes held in the second memory 122, the second signal determination unit 121 determines that authentication has succeeded, and outputs an operation signal to the main apparatus 3 (steps S105 and S106).

As described above, according to the second embodiment, as in the first embodiment, even if a synchronization loss has occurred, authentication can be continued as long as the number of times of synchronization losses is within Nmax−1.

A case in which a third person (attacker) has made a replay attack will be described next with reference to FIG. 15.

Figure 15:
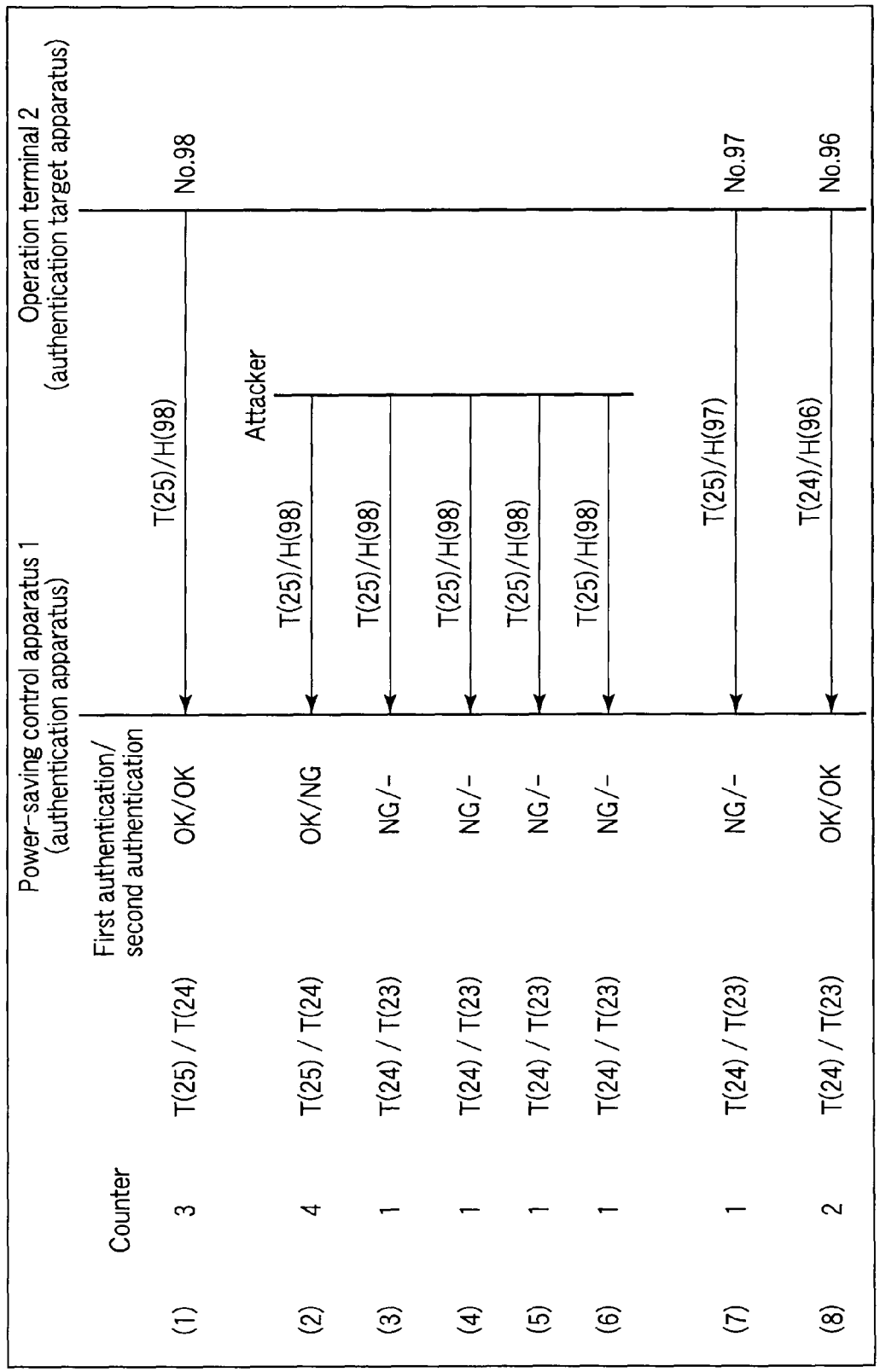
FIG. 15 is a view showing a communication sequence between the power-saving control apparatus and an operation terminal when a third person (attacker) has executed a replay attack.

FIG. 15 shows a case in which after authentication has succeeded three times at No. 100 to No. 98, the power-saving control apparatus 1 has taken a replay attack of repeatedly transmitting a radio operation signal at No. 98 from an attacker who has received the radio operation signal at No. 98. Therefore, after authentication succeeds with first authentication code T(25) and second authentication code H(98) in the radio operation signal at No. 98 in (1) in FIG. 15, T(25) and T(24) are stored as first authentication codes in the first memory 106, and H(97), H(96), H(95), and H(94) are stored as second authentication codes in the second memory 122 with H(98) being deleted. The counter value in the second memory 122 becomes "4".

At the time point when the first replay attack in (2) in FIG. 15 is taken, since the counter value in the second memory 122 is "4", and first authentication code T(25) is stored in the first memory 106, the first authentication succeeds at the first reply attack (step S101 to S104). In the second authentication process, however, since H(98) is not stored in the second memory 122 (only H(97) and subsequent authentication codes are held), the second authentication does not succeed (NO in step S105). The process therefore advances to step S109. Since the counter value is "4" in step S109, the process advances to step S110 to return the counter value in the second memory 122 to "1". In addition, with the processing in steps S111 and S112, T(24) and T(23) are stored as first authentication codes in the first memory 106. Note that in this case, the main apparatus 3 transmits no operation signal.

In the second and subsequent replay attacks in (3) to (6) in FIG. 15, input signal T(25) to the first signal determination unit 105 is not stored as a first authentication code in the first memory 106, and hence is invalid. Therefore, since authentication with the first authentication code does not succeed, no operation signal is sent to the main apparatus 3.

As shown in (7) in FIG. 15, subsequently, when a radio operation signal at No. 97 is received from the operation terminal 2, since the first authentication code at No. 97 is still T(25) and T(25) has already been invalid in the power-saving control apparatus 1 (is not stored in the first memory 106), authentication does not succeed (NO in step S103). Therefore, no operation signal is sent to the main apparatus 3. When a radio operation signal at No. 96 in (8) in FIG. 15 which has been transmitted from the operation terminal 2 is received, since the first authentication code at No. 96 is T(24) and the second authentication code is H(96), both the first authentication and the second authentication succeed (YES in steps S103 and S105). After the authentication codes in the second memory 122 are updated (steps S107 and S108) and the counter value in the second memory 122 is updated (step S113), an operation signal is output to the main apparatus 3.

Note that when a replay attack is taken as described above, the first authentication succeeds or fails, and the second authentication always fails. In (2) in FIG. 15, when the first authentication succeeds and the second authentication fails, the control unit 107 can determine that a replay attack is taken.

In this case, even if the counter value N has not reached Nmax, the first authentication code which is receiving an attack (e.g., first authentication code T(25) as an attack target in FIG. 15) is invalidated (i.e., first authentication code T(25) is deleted from the first memory 106, and a new first authentication code T(23) is stored in the first memory 106). For example, the following condition is added to the conditions in step S109 in FIG. 13:

(condition b2): The first authentication succeeds, and the second authentication fails.

If at least one of the three conditions, i.e., (condition b1) to (condition b3), is satisfied, the process advances to step S110 to update the first memory 106.

In the first embodiment, when a replay attack is delivered, the attack succeeds (an operation signal is output to the main apparatus 3) until the counter value N in the second memory 109 reaches Nmax. In contrast, in the second embodiment, a replay attack does not succeed, and hence the safety can be improved as compared with the first embodiment. Even if the power-saving control apparatus 1 takes a replay attack, since the second authentication unit 152 is started Nmax−1 times at most (if it is determined that a replay attack has been taken, when the first authentication succeeds and the second authentication fails, the second authentication unit 152 is started once at most), an increase in power consumption upon reception of a replay attack can be suppressed within a predetermined range.

As described above, according to the second embodiment, using the same authentication code in a plurality of consecutive authentication processes can suppress the number of first authentication codes to be stored in the first memory 106. The second authentication unit 152 which performs authentication using a second authentication code and the main control unit 153 are turned on and started when authentication by the first authentication unit 151 using a first authentication code succeeds. This can minimize the circuit size and power consumption. Even if the number of authentication codes to be stored in the first memory 106 is decreased and a synchronization loss occurs, authentication can be continued. Adding the second authentication unit 152, which performs authentication using second authentication codes, makes it possible to prevent a replay attack and reduce the threat on security.

In addition, a radio operation signal can be received with a standby power of almost "0" by using the rectifier 102 which generates a rectified voltage by rectifying a radio operation signal received by the antenna 101 and the starting circuit 103 which generates a current upon receiving the rectified voltage, amplifies the current, and outputs a voltage signal corresponding to the magnitude of the amplified current. Using the rectifier 102 and the starting circuit 103 can further save power.

The power-saving control apparatus and method mentioned above can minimize a circuit size and power consumption by minimizing the number of candidates of authentication codes to be verified.

What is claimed is:

1. A power-saving control apparatus comprising:
a first memory to store first to Nth (N is a natural number not less than two) different first authentication codes;
a second memory to store first to Mth (M is a natural number not less than two) different second authentication codes;
a reception circuit to receive (a) a first radio operation signal including a first authentication code and a second authentication code or (b) a second radio operation signal including the first authentication code and a third radio operation signal including the second authentication code, the first authentication code being included in the first authentication codes, the second authentication code being included in the second authentication codes;
a first determination circuit to determine, every time the reception circuit receives the first radio operation signal or both the second radio operation signals and the third radio operation signal, whether the first authentication code in the first radio operation signal or the second radio operation signal is a first valid code which matches one of the first authentication codes stored in the first memory;
a second determination circuit to be started when the first determination circuit determines that the first authentication code in the first radio operation signal or the second radio operation signal is the first valid code, and to determine whether the second authentication code in the first radio operation signal or the third radio operation signal received is a second valid code which matches one of the second authentication codes stored in the second memory;
an output circuit to output an operation signal to a main apparatus when the second determination circuit determines that the second authentication code in the first radio operation signal or the third radio operation signal is the second valid code;
a first control circuit to generate a new second authentication code, every time the second determination circuit determines that the second authentication code in the first radio operation signal or the third radio operation signal received is the second valid code, to delete at least one of the second authentication codes stored in the second memory, the at least one of the second authentication codes being the second valid code, and to store the new second authentication code in the second memory;
a counter circuit to count the number of times the first authentication code in the first radio operation signal or the second radio operation signal received matches a first one of the first authentication codes stored in the first memory; and
a second control circuit to generate a new first authentication code, when (a) a value of the counter circuit is equal to a predetermined set value or (b) the first authentication code in the first radio operation signal or the second radio operation signal matches a second or subsequent one of the first authentication codes stored in the first memory, to delete at least one of the first authentication codes stored in the first memory, and to store the new first authentication code in the first memory, wherein when a replay attack is taken, the first determination circuit determines that the first authentication code in the first radio operation signal or the second radio operation signal received is the first valid code and the second determination circuit determines that the second authentication code in the first radio operation signal or the third radio operation signal received is an invalid code which is not included in the second authentication codes stored in the second memory.

2. The apparatus according to claim 1, wherein the second control circuit generates the new first authentication code, when the first determination circuit determines that the first authentication code in the first radio operation signal or the second radio operation signal received is the first valid code and the second determination circuit determines that the second authentication code in the first radio operation signal or the third radio operation signal received is an invalid code which is not included in the second authentication codes stored in the second memory, to delete at least one of the first authentication codes stored in the first memory, and to store the new first authentication code in the first memory.

3. The apparatus according to claim 1, wherein the second control circuit deletes the first one of the first authentication codes from the first memory.

4. A power-saving control apparatus comprising:
a first memory to store first to Nth (N is a natural number not less than two) different first authentication codes;
a second memory to store first to Mth (M is a natural number not less than two) different second authentication codes;
a reception circuit to receive (a) a first radio operation signal including a first authentication code and a second authentication code or (b) a second radio operation signal including the first authentication code and a third radio operation signal including the second authentication code, the first authentication code being included in the first authentication codes, the second authentication code being included in the second authentication codes;
a first determination circuit to determine, every time the reception circuit receives the first radio operation signal or both the second radio operation signals and the third radio operation signal, whether the first authentication code in the first radio operation signal or the second radio operation signal is a first valid code which matches one of the first authentication codes stored in the first memory;
a second determination circuit to be started when the first determination circuit determines that the first authentication code in the first radio operation signal or the second radio operation signal is the first valid code, and to determine whether the second authentication code in the first radio operation signal or the third radio operation signal received is a second valid code which matches one of the second authentication codes stored in the second memory;
an output circuit to output an operation signal to a main apparatus when the second determination circuit determines that the second authentication code in the first radio operation signal or the third radio operation signal is the second valid code;
a first control circuit to generate a new second authentication code, every time the second determination circuit determines that the second authentication code in the first radio operation signal or the third radio operation signal received is the second valid code, to delete at least one of the second authentication codes stored in the second memory, the at least one of the second authentication codes being the second valid code, and to store the new second authentication code in the second memory;

a counter circuit to count the number of times the first authentication code in the first radio operation signal or the second radio operation signal received matches a first one of the first authentication codes stored in the first memory; and a second control circuit to generate a new first authentication code, when (a) a value of the counter circuit is equal to a predetermined set value or (b) the first authentication code in the first radio operation signal or the second radio operation signal matches a second or subsequent one of the first authentication codes stored in the first memory, to delete at least one of the first authentication codes stored in the first memory, and to store the new first authentication code in the first memory;

wherein when a replay attack is taken, the first determination circuit determines that the first authentication code in the first radio operation signal or the second radio operation signal received is the first valid code and the second determination circuit determines that the second authentication code in the first radio operation signal or the third radio operation signal received is an invalid code which is not included in the second authentication codes stored in the second memory, and the reception circuit includes an antenna, a rectifier to rectify the first radio operation signal or the second radio operation signal received by the antenna, to generate a rectified voltage, and a starting circuit to generate a current upon receiving the rectified voltage, to amplify the current, and to output a voltage signal corresponding to a magnitude of the current amplified.

5. A power-saving control method used for a power-saving control apparatus including a reception circuit to receive (a) a first radio operation signal including a first authentication code and a second authentication code or (b) a second radio operation signal including the first authentication code and a third radio operation signal including the second authentication code, the first authentication code being included in the first authentication codes, the second authentication code being included in the second authentication codes;

a first memory to store first to Nth (N is a natural number not less than two) different first authentication codes;

a second memory to store first to Mth (M is a natural number not less than two) different second authentication codes;

a first determination circuit to determine, every time the reception circuit receives the first radio operation signal or both the second radio operation signals and the third radio operation signal, whether the first authentication code in the first radio operation signal or the second radio operation signal received is a first valid code which matches one of the first authentication codes stored in the first memory;

a second determination circuit to determine whether the second authentication code in the first radio operation signal or the third radio operation signal received is a second valid code which matches one of the second authentication codes stored in the second memory; and a control circuit to perform control for outputting an operation signal to a main apparatus, the method comprising:

receiving the first radio operation signal or the second radio operation signal by the reception circuit;

determining, by the first determination circuit, whether the first authentication code in the first radio operation signal or the second radio operation signal received is the first valid code;

starting the second determination circuit and the control circuit by the first determination circuit when the first authentication code in the first radio operation signal or the second radio operation signal received is determined to be the first valid code;

determining, by the second determination circuit, whether the second authentication code in the first radio operation signal or the third radio operation signal received is the second valid code;

outputting, by the control circuit, the operation signal to the main apparatus when the second authentication code in the first radio operation signal or the third radio operation signal received is determined to be the second valid code;

generating, by the control circuit, a new second authentication code, when the second authentication code in the first radio operation signal or the third radio operation signal received is determined to be the second valid code, to delete at least one of the second authentication codes stored in the second memory, the at least one of the second authentication codes being the second valid code, and to store the new second authentication code in the second memory;

incrementing, by the control circuit, a counter value by one when the first authentication code in the first radio operation signal or the second radio operation signal received matches a first one of the first authentication codes stored in the first memory; and generating, by the control circuit, a new first authentication code when (a) the counter value is equal to a predetermined set value or (b) the first authentication code in the first radio operation signal or the second radio operation signal received matches a second or subsequent authentication code of the authentication codes stored in the first memory, or (c) the first authentication code in the first radio operation signal or the second radio operation signal received is determined to be the first valid code and the second authentication code in the first radio operation signal or the third radio operation signal received is determined to be an invalid code which is not included in the second authentication codes stored in the second memory, to delete at least one of the first authentication codes stored in the first memory, and to store the new first authentication code in the first memory, wherein when a replay attack is taken, the first determination circuit determines that the first authentication code in the first radio operation signal or the second radio operation signal received is the first valid code and the second determination circuit determines that the second authentication code in the first radio operation signal or the third radio operation signal received is an invalid code which is not included in the second authentication codes stored in the second memory.

* * * * *